(12) United States Patent
Shiohara

(10) Patent No.: US 9,632,737 B2
(45) Date of Patent: Apr. 25, 2017

(54) INFORMATION PROCESSING DEVICE, AND METHOD AND MEDIUM FOR THE SAME

(71) Applicant: CANON KABUSHIKI KAISHA, Tokyo (JP)

(72) Inventor: Tetsuya Shiohara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 259 days.

(21) Appl. No.: 13/928,073

(22) Filed: Jun. 26, 2013

(65) Prior Publication Data

US 2014/0009787 A1 Jan. 9, 2014

(30) Foreign Application Priority Data

Jul. 3, 2012 (JP) .................................. 2012-149763

(51) Int. Cl.
  *G06F 3/12* (2006.01)
  *H04N 1/60* (2006.01)

(52) U.S. Cl.
  CPC .......... *G06F 3/1256* (2013.01); *G06F 3/1208* (2013.01); *H04N 1/6027* (2013.01); *G06F 3/125* (2013.01); *G06F 3/1276* (2013.01)

(58) Field of Classification Search
  None
  See application file for complete search history.

(56) References Cited

U.S. PATENT DOCUMENTS

| 7,418,652 | B2* | 8/2008 | Ornstein et al. ............... 715/200 |
| 2008/0151294 | A1* | 6/2008 | Natori ................... G06F 17/211 358/1.15 |
| 2008/0285066 | A1* | 11/2008 | Oshima ...................... G06T 1/20 358/1.13 |
| 2010/0027907 | A1* | 2/2010 | Cherna ................. G06T 11/001 382/274 |
| 2011/0310411 | A1* | 12/2011 | Hirano ................. H04N 1/6058 358/1.9 |

FOREIGN PATENT DOCUMENTS

| JP | 2009-282843 A | 12/2009 |
| JP | 2009282843 A * | 12/2009 |
| JP | 2009-282843 A5 | 7/2011 |

\* cited by examiner

*Primary Examiner* — Marivelisse Santiago Cordero
*Assistant Examiner* — Neil R McLean
(74) *Attorney, Agent, or Firm* — Fitzpatrick, Cella, Harper & Scinto

(57) ABSTRACT

In the case where display contents are converted according to a set value in a pixel data process, even in the case where there is a limitation in the number of instructions or the number of instructions suitable to be handled for one pixel data process is exceeded, setting contents are reflected on displayed pixel data. Conversion processing to be executed is divided into a plurality of pixel data processes so that the number of instructions falls within an appropriate range. The display controls are overlappingly arranged in the number same as the divided pixel data processes in an area to be processed, and by assigning the divided pixel data processes in a processing executing order to the display controls from the display control in the upper layer, the plurality of pixel data processes is reflected on display.

17 Claims, 11 Drawing Sheets

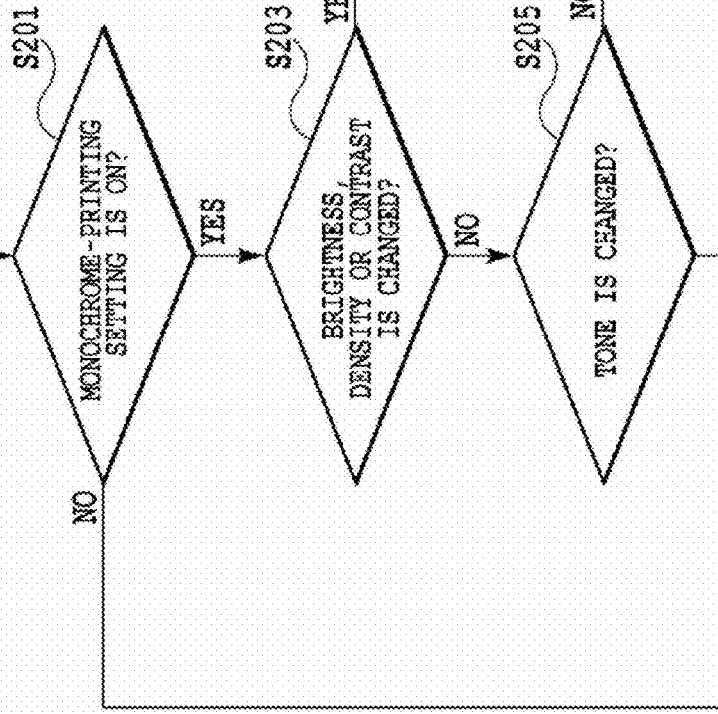

INFORMATION PROCESSING DEVICE, AND METHOD AND MEDIUM FOR THE SAME

BACKGROUND OF THE INVENTION

Field of the Invention

The present invention relates to an information processing device, and a method and a medium for the same.

Description of the Related Art

In a printing system using a computer equipped with an operating system (OS) such as Windows (Registered Trademark), an application program (hereinafter referred to as application) and the like are executed. Print data generated through execution of such application is stored in a spool file in a data format commonly used in the OS. In the case where print processing is executed by the application, and the generated print data is stored in the spool file, to print the print data, the OS generally calls a printer driver. The called printer driver reads the print data stored in the spool file, produces an image by an image generating unit of the printer driver, and converts the image into a print command that can be interpreted by the printer. The print command generated by the conversion is transmitted to the printer, and the printer interprets the command to form an image on a recording medium, for example, thereby executing the print processing. Conventionally, in such printing system, to preview an actual printing mode, the printer driver executes the print processing, and activates a previewer for displaying a print image. Such preview is generally achieved by producing display image data for print preview in the image generating unit, delivering the produced image data to the previewer, and displaying the image data.

In recent years, as the data format of data stored in the spool file, an XPS format (XML Paper Specification) rather than a conventional EMF format (Enhanced Meta File) has been used. Such printing system adopts an XPS printer driver capable of handling data in the XPS format as the printer driver. Since the XPS format is an open-standard electronic document format developed by Microsoft Corporation, the OS is provided with a display function of displaying the print data passed to the OS as it is. In the case of offering a print preview function in such the printing system, by using the display function of the OS, XPS data as the print data can be displayed without being converted into display image data (Refer to, for example, Japanese Patent Laid-open No. 2009-282843).

Furthermore, it is also possible to add a print-setting changing function of changing print setting while checking a print result to the print preview function. Examples of the print-setting altering function include a color adjusting function of adjusting coloring of a print result. Specifically, according to the color adjusting function, monochrome printing of printing a manuscript in a monochrome mode can be set, and coloring can be adjusted by changing adjustment items such as density and contrast. In the case where the print preview function includes the color adjusting function, since contents of color adjustment set by the user are checked on print preview, it is desirable to immediately reflect the set contents. As long as the image generating unit produces display image data for print preview, the color adjustment can be reflected on the produced display image data, and the display image data can be displayed. However, in the case where data in the above-mentioned XPS format is passed to the OS for print preview, it is needed to previously reflect the color adjustment on the data itself in the XPS format to be passed to the OS. In this case, to perform print preview, it is necessary to analyze the data in the XPS format, and convert color of all of images and character strings, which are contained in the data in the XPS format, thus requiring extremely complicated processing. In order to simplify the processing, there is proposed a method of using a pixel data process in which data in the XPS format is not previously processed, pixel data generated for image display is converted, and display contents are changed. The pixel data process can be executed by, for example, a pixel shader offered by DirectX of Microsoft Corporation.

In actual processing, for example, by assigning a module that previously implement the pixel data process to a control on which an image is displayed (hereinafter referred to as display control), pixel data to be displayed is converted according to the corresponding display control. This enables a result of color adjustment designated by the user using the print preview function to be reflected on displayed pixel data without previously converting data in the XPS format.

Conventionally, the number of instructions that can be used in the pixel data process is sometimes limited. Moreover, the number of pixel data processes that can be assigned to one display control is one. For this reason, in complicated conversion processing, due to such limitation, all of necessary processes disadvantageously cannot be executed. Specifically, for example, in the above-mentioned color adjustment, a plurality of setting items including brightness, density, contrast, and tone is sometimes set, and it is difficult to execute the conversion processing addressing all of the setting items in one pixel data process. As a result, disadvantageously, preview display reflecting change contents of the all setting items cannot be achieved.

Further, even in the case where there is no such limitation in the number of instructions, since a lot of processes are executed at one time, processing time increases and calculation accuracy may decrease.

Thus, in conversion of display contents according to a set value in the pixel data process, the present invention intends to reflect setting contents on pixel data to be displayed even in the case where there is the limitation in the number of instructions or the number of instructions suitable to be handled for one pixel data process is exceeded.

SUMMARY OF THE INVENTION

An information processing method according to the present invention for solving the above-mentioned problems includes a receiving step of receiving a layer structure that displays one image by executing a plurality of display controls displaying pixel data in an overlapped manner; an assigning step of dividing a pixel data process assigned so as to execute image processing on the pixel data to be displayed by the display control into a plurality of processes, adding a required number of display controls to the display control included in the received layer structure, and assigning the individual pixel data processes divided in a predetermined processing execution order to the display controls overlappingly arranged in the number same as the divided pixel data processes, the display controls each having a dimension that includes an area for each pixel data process, in order from the display control arranged in an upper layer; and a processing step of executing the image processing on the pixel data displayed by the display controls to which the pixel data processes are assigned in the predetermined processing execution order in the pixel data process, and superimposing and displaying the pixel data subjected to the image processing.

According to the present invention, even in the case where the number of instructions suitable to be handled for one pixel data process is exceeded, the conversion processing for reflecting the set value can be applied to the pixel data to be displayed.

Further features of the present invention will become apparent from the following description of exemplary embodiments (with reference to the attached drawings).

BRIEF DESCRIPTION OF THE DRAWINGS

FIG. 10 is a diagram showing the relationship of FIGS. 10A and 10B; and

FIGS. 10A and 10B are a view showing an example of processing of assigning the pixel data process according to the setting item in accordance with the embodiment of the present invention.

DESCRIPTION OF THE EMBODIMENTS

Embodiments according to the present invention will be described below with reference to appended figures. The embodiments do not limit the present invention according to claims, and all of combinations of features described in the present embodiments are not requisite to solving units of the present invention.

<First Embodiment>
<Configuration of Printing System>
<Hardware Configuration Diagram of Information Processing Device>

Figure 1:
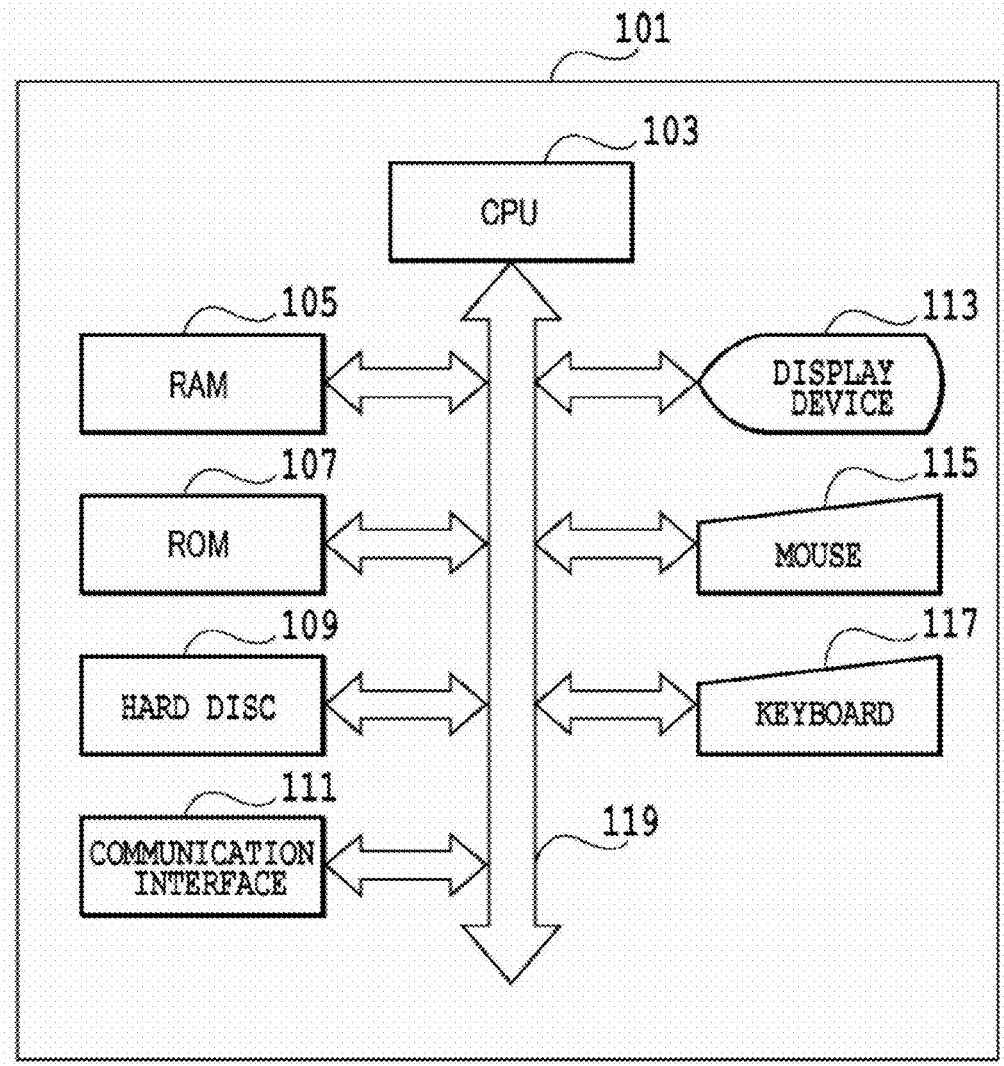
FIG. 1 is a block diagram showing a configuration of a personal computer used in the present embodiment.

FIG. 1 is a block diagram showing a configuration of a personal computer (hereinafter referred to as PC) 101. The PC 101 includes a CPU 103, a RAM 105, a ROM 107, a hard disc 109, a communication interface 111, a display device 113, a mouse 115, a keyboard 117, and a system bus 119. The CPU 103 calculates, determines, and controls data and instructions according to a program stored in the RAM 105, the ROM 107, or the hard disc 109. The RAM 105 is used as a temporary storage area in the case where the CPU 103 executes various kinds of processing. The hard disc 109 stores the operating system (OS), a browser, other application software, and so on. That is, the CPU 103 generally reads the program stored in the ROM 107 or the hard disc 109, installs the program into the RAM 105, and executes the program using the RAM 105 as a work memory, thereby performing various kinds of control. The communication interface 111 is an interface for data communication with the printer, such as USB, SCSI, and wireless equipment or a network interface for transmitting/receiving data to/from an external WWW server via the Internet. The display device 113 includes a CRT or liquid crystal display, and a graphic controller, and performs display on a graphic user interface (GUI). The mouse 115 and the keyboard 117 are input devices for the user to issue various instructions to the PC 101. The system bus 119 exchanges data with the CPU 103, the RAM 105, the ROM 107, the hard disc 109 and the like.

<Operations of Printer Driver>

Figure 2:
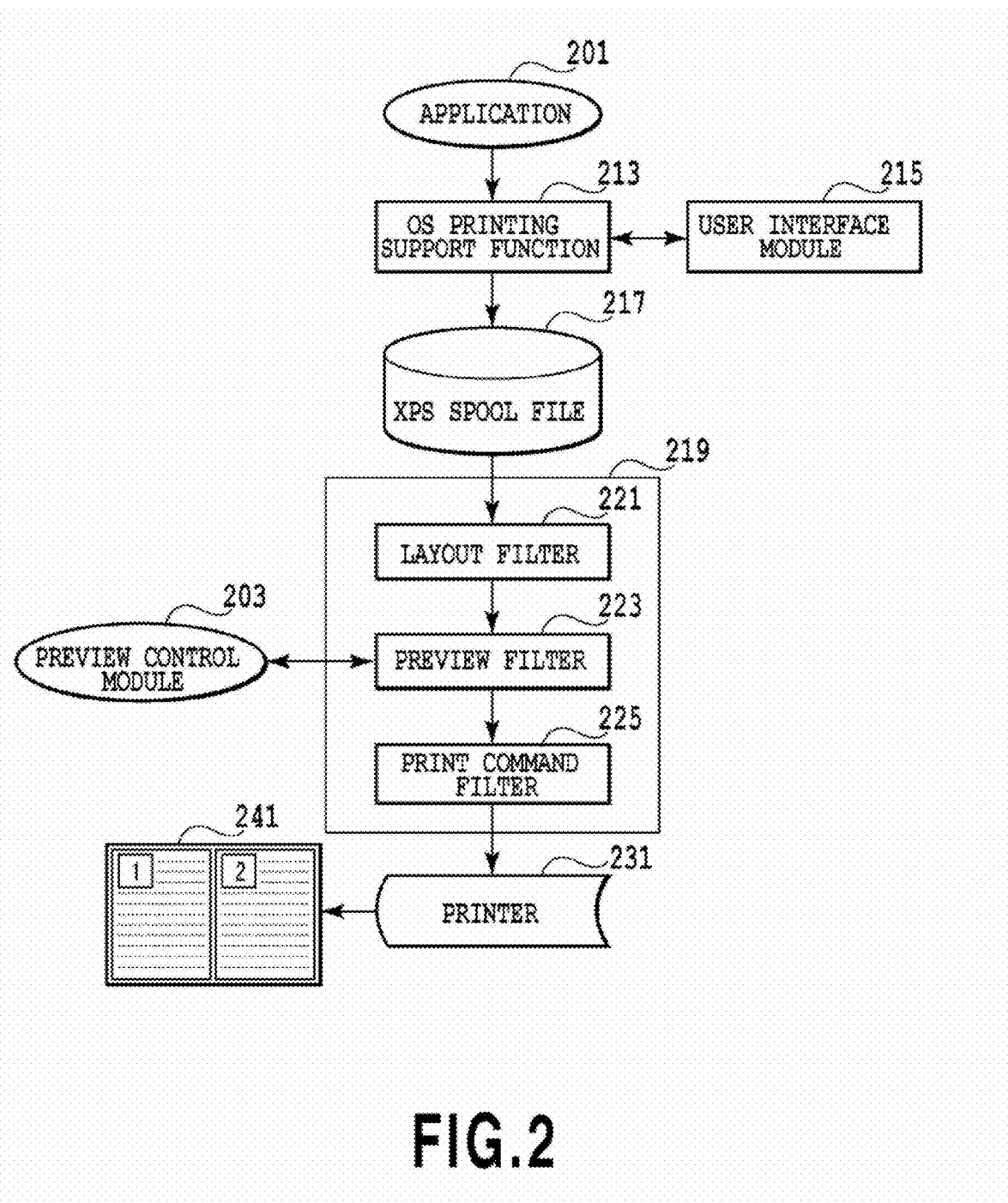
FIG. 2 is a block diagram showing an example of a printer driver in accordance with the embodiment of the present invention.

FIG. 2 is block diagram conceptually showing a printing system executed on the PC 101 in the present embodiment, centering on an OS printing support function and a printer driver.

In the printing system shown in FIG. 2, print data produced by an application 201 is temporarily stored in an XPS spool file 217 through an OS printing support function 213. A filter group 219 of the printer driver converts the stored print data into a print command that can be interpreted by the printer on the basis of print setting information, and supplies the command to a printer 231, thereby executing printing.

The user interface module 215 provides a function of allowing the user to set sheet size generally used for printing, printing direction, and other attributes. The user interface module 215 according to the present invention also has a function of activating a print preview function of displaying a print image on the display device 113 before the start of a printing operation of the printer. The user interface module 215 sends print setting information containing set values of a plurality of print setting items to the application 201.

In printing any produced document, the application 201 transmits the print setting information received from the user interface module 215 to the OS printing support function 213 to instruct printing start and printing termination and perform print setting. The application also instructs drawing start and drawing termination of each page in the document. The OS printing support function 213 stores (or spools) the print data and the print setting information, which are produced by the application, in the XPS spool file 217. In reading (or despooling) of the spooled print data, each filter is called by the OS printing support function.

The filter group 219 of the printer driver includes one or more filters, and has a function of reading the print data from the XPS spool file 217, converting the print data into the print command that can be interpreted by the printer, and supplying the command to the printer 231 to perform printing. The filter group 219 in the present embodiment includes a layout filter 221 as a layout processing unit, a preview filter 223 as a preview document producing unit, and a print command filter 225 as a print command converting unit. However, the layout function and the print preview function can be realized by one filter, and any unnecessary filter can be removed. The filters used in the present embodiment are not limited to the above-described filter configuration.

The layout filter 221 receives the data in the XPS format stored in the XPS spool file 217 as an input, performs layout processing of pages on the basis of the print setting information, and outputs layout data in the XPS format. The layout processing in the present embodiment includes and is not limited to N-up printing of printing a plurality of pages on one sheet and poster printing of printing one page on a plurality of sheets, for example.

The preview filter 223 receives an input of the layout data in the XPS format from the layout filter 221, and executes print preview processing on the basis of the print setting by use of a preview control module 203 for the user. The preview filter 223 determines whether or not print preview setting of the print data is ON, and in the case of ON, activates the preview control module 203, and delivers the data in the XPS format as the print data to the preview control module 203. The preview control module 203 displays the data in the XPS format, thereby displaying a print result on the display device 113. A configuration of a display screen supplied by the preview control module 203 will be described later with reference to FIG. 3. In the case where the print preview setting is OFF, the print preview is not performed, and thus the preview filter 223 transmits the print data to the next filter.

The print command filter 225 receives an input of the print data output from the preview filter 223, converts the data in the XPS format into the print command that can be interpreted by the printer according to the print setting information, and outputs the command. The print command filter 225, in the case of converting the input data in the XPS format into image data, is commonly referred to as a render filter. The render filter is often used in the printer driver for inexpensive raster printer represented by inkjet printers. In the case where the print command filter 225 acts as the render filter, the input data in the XPS format is converted into image data once. After that, through steps including conversion of color space and image processing such as binarization, the image data is converted into the print command that the raster printer can interpret. In the case where a sophisticated printer represented by page printers can interpret the data in the XPS format, the print command filter 225 edits the input data in the XPS format, and outputs the data in the XPS format. As a matter of course, in the case where the print command filter 225 does not need to process the input data in the XPS format, the data is output as it is, or the print command filter 225 is not included in the printer driver from the beginning.

The printer 231 as an output device interprets the print command generated by the print command filter 225, and forms a visible image on a print sheet. Note that, a print sheet 241 as an example of the print result shown in FIG. 2 conceptually shows an example in the case where the layout filter 221 executes the 2-up processing.

<Preview Window of Preview Control Module>

Figure 3:
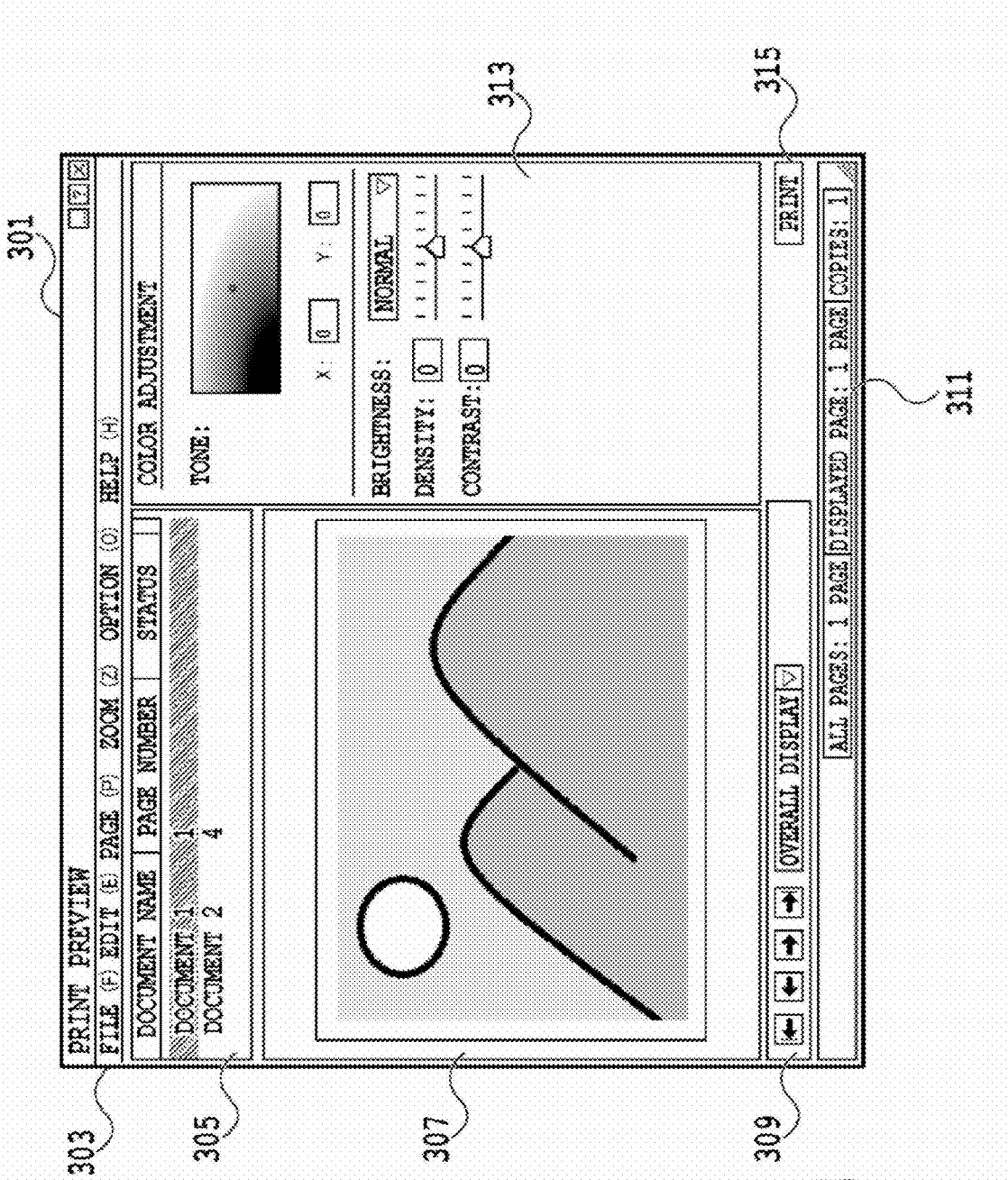
FIG. 3 is a view showing an example of a preview window in accordance with the embodiment of the present invention.

FIG. 3 shows an example of the display screen (preview window) supplied by the preview control module 203 in the present embodiment. In the present embodiment, a print preview window 301 adopts a liquid crystal screen to which a touch panel is applied. Thereby, the print preview window 301 functions as a display area for displaying a preview image, print setting of the print data and the like, and as an input unit for allowing the user to change a display mode of the preview image and the like. However, the display area and the input unit may be provided separately.

A menu bar 303 has a menu format such that the user can select an instruction issued to the preview control module 203, such as display switching. A document list 305 displays a list of print data that can be currently processed by the preview control module 203. Accordingly, in the present embodiment, the print data selected from the document list 305 is displayed or printed. A page number column displays the page number of the selected print data. The data in the XPS format for print preview in layout and tone that are assumed to be actually formed on the print sheet as the print data is displayed in a preview display area 307. Using a user operating unit of a tool bar 309, the user can switch the display page or change display size. A set value of a representative setting item related to print setting of the print data currently indicating the print preview function is displayed in a display area 311. Referring to FIG. 3, it is understood that the page currently previewed is the first page, and the number of copies set by print setting is one.

In a print setting changing area 313, the set value of the representative setting item related to print setting of the selected print data can be displayed, and the set value can be changed. In the present embodiment, the preview control module 203 has a function of adjusting color of the print data, and can change tone, brightness, density and contrast. In the case where change of setting content affects the print result, the preview display area 307 needs to be updated according to the changed setting content. Through this updating, each time the user changes the setting content, the user can check how the content to be printed is changed. The user checks the print result and changes the print setting, and then, presses a print button 315, thereby instructing start of printing of the print data selected from the document list 305.

<Configuration of Preview Display Area>

Figure 4:
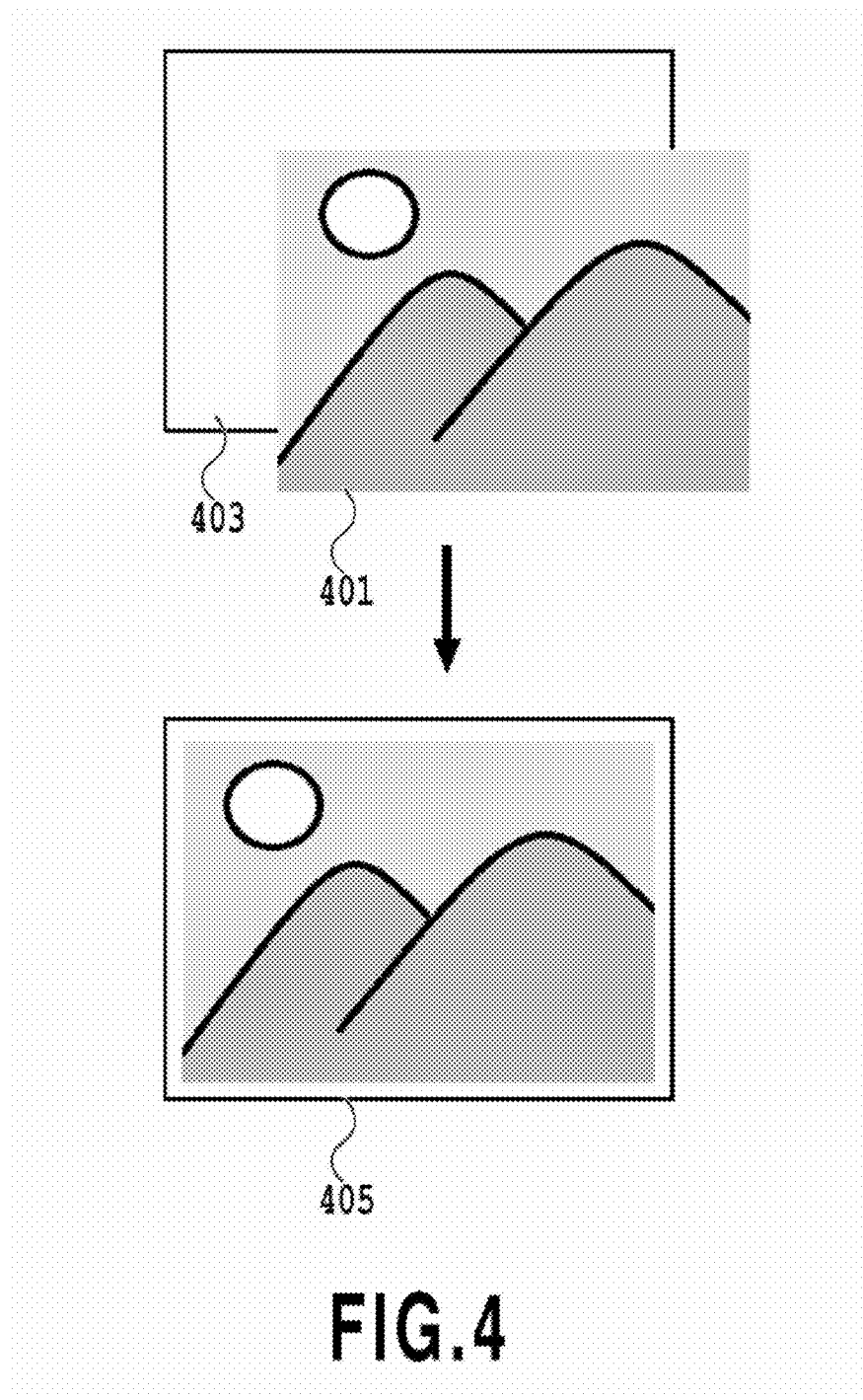
FIG. 4 is a view showing a configuration of a preview display area in accordance with the embodiment of the present invention.

FIG. 4 is a view showing a general configuration of a print result display displayed in the preview display area 307. The preview display area 307 is configured with a document display control 401 and a base display control 403. In the case where the data in the XPS format to be printed is designated in the document display control 401, the OS displays the designated data in the XPS format. The base display control 403 is provided to represent sheet, and in the case where a white area is set to have a size corresponding to the sheet size of print setting, the OS draws the white area having the size corresponding to the sheet size according to the setting. It is possible to display the sheet size and margin assumed to be the actual print result by the base display control 403, and to reproduce faithfully an output result.

The document display control 401 and the base display control 403 have a layer structure, and the document display control 401 is located in an upper layer than the base display control 403. In the case where preview display is executed, the OS displays pixel data 405 obtained by overlapping the document display control 401 and the base display control 403. Change to be performed on the control in the lower layer is performed on the overlapping result including the upper layer. Thus, in the case of reflecting the change result in the print setting changing area 313, the preview control module 203 designates the pixel data process for the base display control 403. As a result, the pixel data process is reflected on the superimposed pixel data 405, thereby enabling to reflect the changed print setting on the preview display area 307.

However, there is a case that the number of instructions used in the pixel data process is limited. As an example of the limitation in the number of instructions, the number of instructions is set for each of arithmetic operations such as addition and multiplication, and the total number of instructions to be executed in the pixel data process has an upper limit. Alternatively, even in the case where there is no limitation in the number of instructions, a lot of steps are performed in one pixel data process, possibly increasing the processing time or decreasing the calculation accuracy.

That is, generally, in one pixel data process, the number of instructions suitable for the system or the device is present. However, since many setting items that affect display, for example, tone adjustment, are present, in the case where conversion processing corresponding to each of such setting items is executed, the number of instructions suitable to be handled for one pixel data process may be exceeded. Since the number of pixel data processes that can be designated for one display control is one, a plurality of pixel data processes cannot be designated for the base display control 403. Therefore, it is needed to combine the plurality of pixel data processes with each other and reflect it on display.

Figure 5:
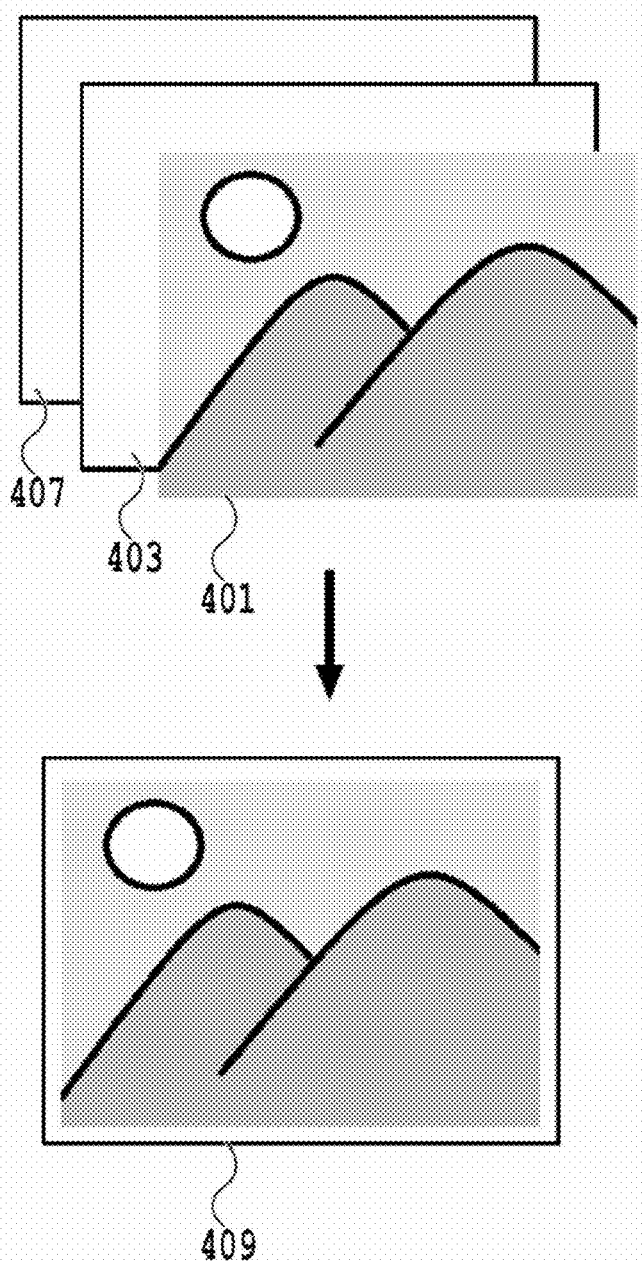
FIG. 5 is a view showing a configuration of the preview display area in accordance with the embodiment of the present invention.

FIG. 5 is a view showing an example of a configuration to apply the plurality of pixel data processes to preview display in consideration of the above-mentioned problem. A pixel data process-display control 407 is provided in a lower layer than the conventional document display control 401 and the base display control 403. The pixel data process-display control 407 includes the whole range of the document display control 401, and is arranged in the preview display area 307, with location and size being included in the base display control 403. The pixel data process-display control 407 is present lower than the base display control 403, and has the size to be included in the base display control 403. Therefore, even in the case where the pixel data process-display control 407 is superimposed, it does not affect pixel data 409 as final display contents.

<Assignment of Pixel Data Process>

Figure 6:
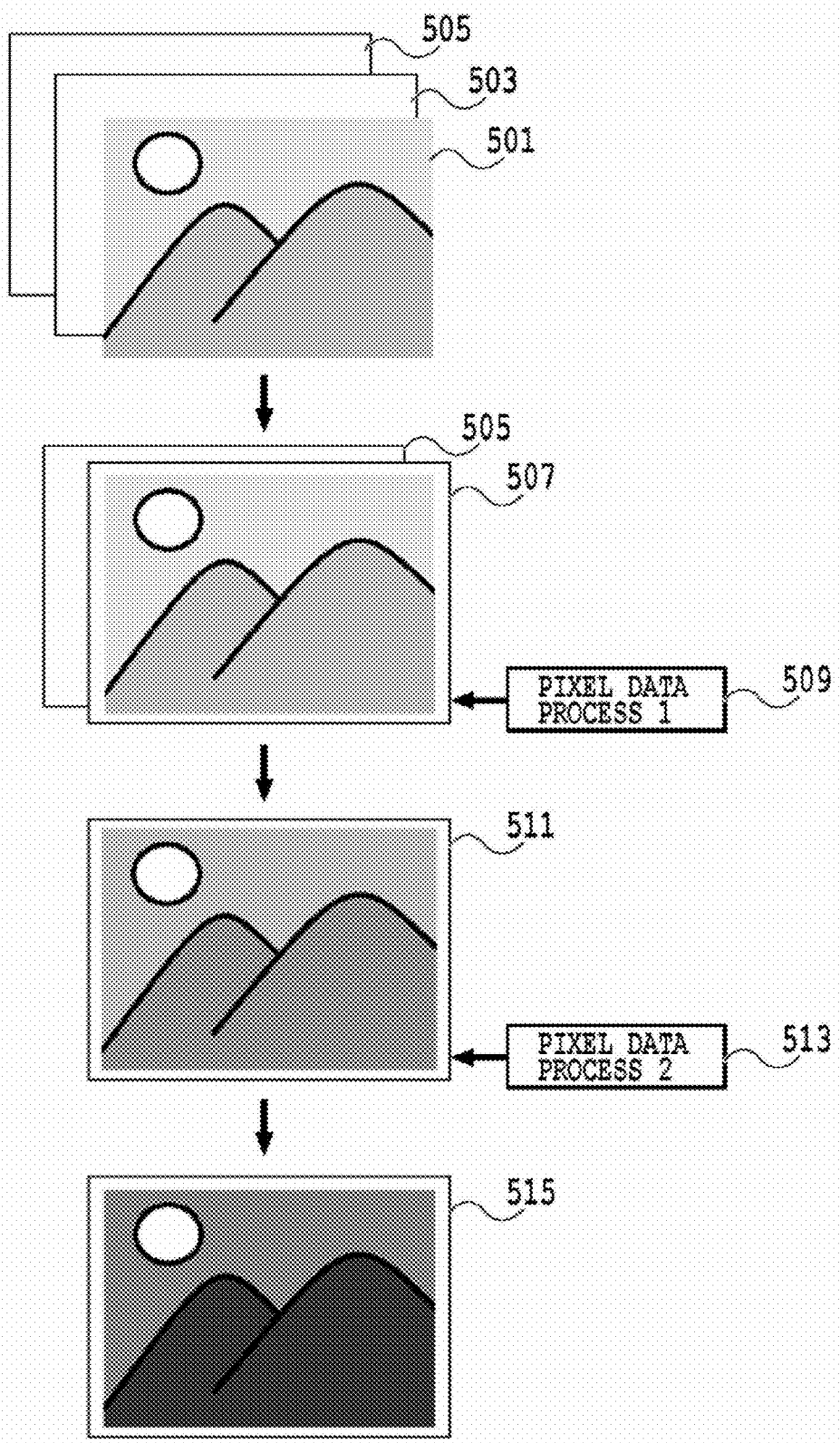
FIG. 6 is a view showing a pixel data process at display updating in accordance with the embodiment of the present invention.

FIG. 6 is a flow chart of processing in which a plurality of pixel data processes is applied to display at display updating. As described above, the preview display area 307 is configured with a document display control 501, a base display control 503, and a pixel data process-display control 505. The preview control module 203 executes the pixel data process by dividing it into a plurality of processes.

In the present embodiment, the pixel data process is divided into two processes of a pixel data process 1 and a pixel data process 2. In the pixel data process 1 (509), conversion processing corresponding to change in monochrome conversion, brightness, density and contrast is executed, and in the pixel data process 2 (513), conversion processing corresponding to change in tone is executed. Here, the two pixel data processes need to be executed in consideration of the execution order in which the conversion processing is applied. In the present embodiment, by applying conversion corresponding to tone to conversion result corresponding to brightness, density and contrast, a desired color adjustment result can be obtained. Thus, the preview control module 203 divides the pixel data process with the above-described configuration, and executes the divided pixel data processes in an appropriate order. Although the conversion processing corresponding to the plurality of setting items is executed in the pixel data process 1, conversion processing based on each setting made in the pixel data process 1 also needs to be implemented in the order to be executed.

In assignment of the pixel data process, the process to be performed earlier needs to associate with an upper layer. For this reason, it is needed that the earlier conversion processing is assigned to the display control in the upper layer. Accordingly, the preview control module 203 assigns the pixel data process 1 to the base display control 503, and the pixel data process 2 to the pixel data process-display control 505. In assigning the pixel data process to the display control, the preview control module 203 delivers the current set value of the setting item used in each pixel data process, as a parameter. In this manner, the pixel data process executes the conversion processing according to the set value, and change in the setting contents is reflected on the pixel data to be displayed.

As described above, in the case where each pixel data process is assigned to the display control, the OS next generates pixel data according to the pixel data process assigned by the preview control module 203. Using the case where the displayed pixel data is updated as an example, processing in which the OS generates the pixel data according to the pixel data process assigned by the preview control module 203 will be described below. First, the OS generates the pixel data 507 obtained by overlapping the document display control 501 and the base display control 503. Next, the OS applies the pixel data process 1 (509) assigned to the base display control 503 to the pixel data 507 to perform conversion corresponding to the set values of monochrome conversion, brightness, density and contrast.

The result that the OS performs the pixel data process 1 (509) on the pixel data 507 and the pixel data process-display control 505 are overlapped to generate pixel data 511. The OS applies the pixel data process 2 (513) assigned to the pixel data process-display control 505 to the pixel data 511 to generate pixel data 515. The pixel data 515 is displayed in the preview display area 307. Through the above processing, the preview control module 203 achieves preview display to which the pixel data process is applied.

It is noted that the pixel data process can be divided into any number of processes. In the case where three or more pixel data processes are applied, it is needed to arrange the pixel data process-display controls corresponding to the divided number. Accordingly, the method of dividing the pixel data process is not limited to the present embodiment, and the pixel data process may be freely divided as long as the order of the pixel data processes can be maintained, for example, one pixel data process is set for one setting item. The document display control among the display controls for assignment may be at the head. In this case, the number of added pixel data process-display controls can be reduced. One or more setting items need not to be assigned to one pixel data process, and conversion processing corresponding to one setting item can be executed in two or more pixel data processes.

Figure 7:
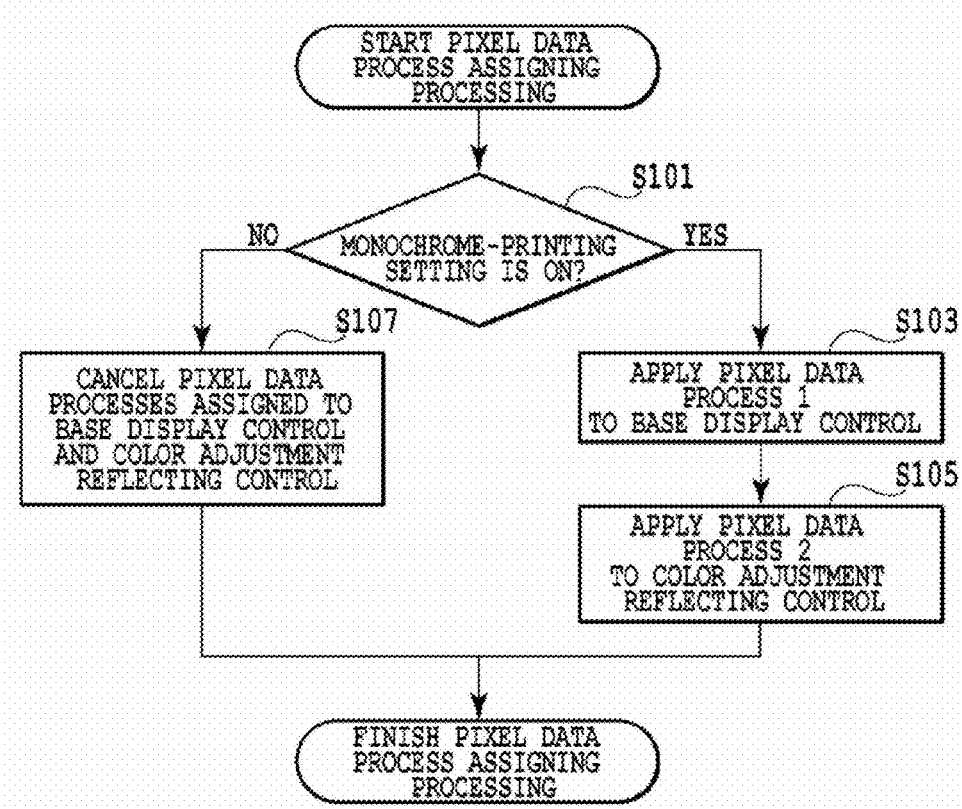
FIG. 7 is a view showing an example of processing of assigning the pixel data process in accordance with the embodiment of the present invention.

FIG. 7 shows an example of a flow chart showing processing in which the preview control module 203 changes assignment of the pixel data process. The assignment of the pixel data process may be changed in the case where setting that affects the print result, such as color adjustment, is changed and however, it is not limited to this case. In the example shown in FIG. 7 in the present embodiment, assuming that setting contents in the print setting changing area 313 are reflected only in the case where the monochrome-printing setting is ON, only in this case, change in the setting contents is reflected on the assignment of the pixel data process. However, assuming that the print result is affected also in the case where monochrome-printing setting is OFF, corresponding setting change may be made.

First, in S101, the preview control module 203 determines whether or not monochrome-printing setting is ON, and the procedure proceeds to S103 in the case of ON, and proceeds to S107 in the case of OFF. In S103, the preview control module 203 assigns the pixel data process 1 (509) to the base display control 503, and the procedure proceeds to S105. In S105, the preview control module 203 assigns the pixel data process 2 (513) to the pixel data process-display control 505.

S107 is processing executed in the case where monochrome-printing setting is OFF. In the present embodiment, only in the case where monochrome-printing setting is ON, the print setting changing area 313 can be set. That is, in the case where monochrome-printing setting is OFF, the print setting changing area 313 cannot be set, and no change is made. For this reason, in 5107, the preview control module 203 cancels the pixel data process assigned to each of the base display control 503 and the pixel data process display control 505. In the present embodiment, since in the case where the monochrome-printing setting is OFF, the conversion processing is assumed not to be made, the pixel data process is cancelled. However, in the case where another conversion processing is executed in the case of monochrome-printing setting of OFF, another pixel data process is assigned. As a matter of course, in the case where the conversion processing executed in the case where the monochrome-printing setting is OFF can be addressed by changing the set value in the same pixel data process, it is no need to change assignment. At display updating, the pixel data process set in S101 to S107 is executed to convert contents to be displayed in the preview display area 307.

The above-mentioned configuration enables the conversion processing including the large number of instructions to be reflected on display.

<Second Embodiment>

In the first embodiment, the conversion processing including the large number of instructions can be achieved without problems of processing time and accuracy by using the plurality of pixel data processes. However, in use of the present method, the pixel data process is executed each time the assigned layer is superimposed, disadvantageously increasing processing time. Thus, in the present embodiment, the processing time can be decreased by assigning and cancelling the pixel data process with respect to the display control according to the changed setting item.

Figure 8:
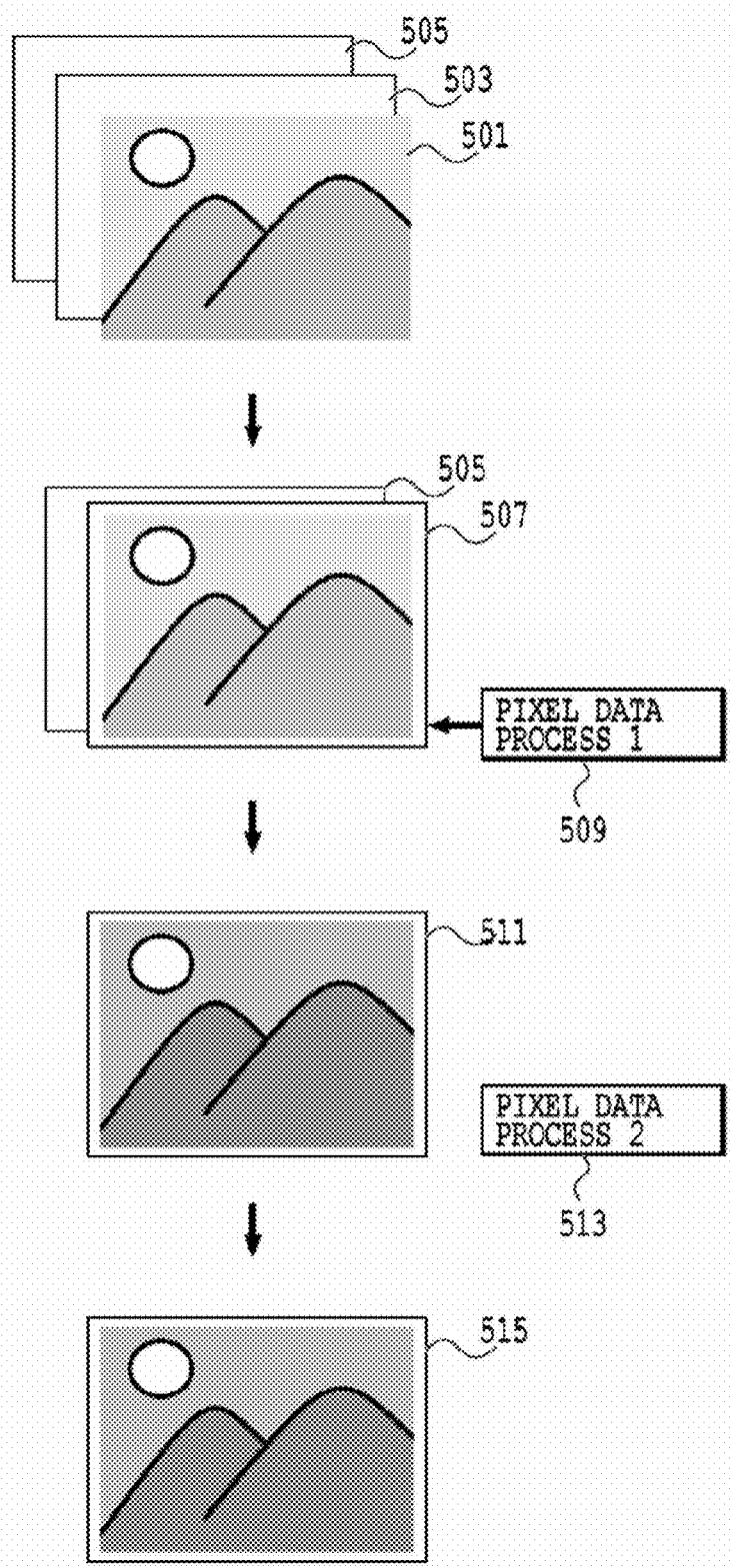
FIG. 8 is a view showing the pixel data process according to a setting item in accordance with the embodiment of the present invention.

FIG. 8 is a view showing an example of pixel data generating processing in the case where assignment of the pixel data process is switched according to the setting item. In the pixel data process, the conversion processing of display contents corresponding to one or more setting items that can be set in the print setting changing area 313 is executed, respectively. Accordingly, it is no need to execute the pixel data process that has no change in the corresponding setting item. Then, prior to execution of the pixel data process, the preview control module 203 checks a current value of each setting item, and checks whether or not the current value is changed from a default value as a specified value of all setting items corresponding to each pixel data process.

The preview control module 203 cancels assignment of the pixel data process in which no corresponding setting item is changed to the display control. Thereby, only the necessary and uncancelled pixel data process can be performed according to setting. However, the monochrome conversion in monochrome printing also needs to be executed in the case where only tone is changed. For this reason, in the case where monochrome conversion is included only in the pixel data process 1, the pixel data process 1 is cancelled as other setting items are not changed and thus, monochrome conversion is not executed. In the case where the pixel data process 1 is assigned without fail in order to avoid the above-mentioned situation, the present embodiment becomes meaningless. Thus, both the pixel data process 1 and the pixel data process 2 have monochrome conversion as common processing. That is, in the pixel data process 1, conversion corresponding to monochrome conversion, brightness, density and contrast can be achieved, and in the pixel data process 2, conversion corresponding to monochrome conversion and tone can be achieved. As a result, in the case where only tone is changed, the conversion processing necessary by only the pixel data process 2 can be achieved.

FIG. 8 is a view showing processing executed in the case where any of brightness, density and contrast is changed and tone is not changed in the print setting changing area 313. Since setting of brightness, density or contrast is changed, the preview control module 203 assigns the pixel data process 1 to the base display control 503. Further, since setting of tone is not changed, the preview control module 203 cancels the pixel data processs 2 from the pixel data process-display control 505.

At display updating, the OS first generates the pixel data 507 obtained by overlapping the document display control 501 and the base display control 503. Since the pixel data process 1 is assigned to the base display control 503, the pixel data 507 including the upper layer is subjected to the conversion processing corresponding to set values of monochrome conversion, brightness, density and contrast. Next, the OS superimposes the pixel data 507 subjected to the pixel data process 1 and the pixel data process-display control 505 to generate the pixel data 511. Since assignment of the pixel data process 2 to the pixel data process-display control is cancelled, the pixel data 511 as it is becomes the pixel data 515 as actual display contents, and is displayed in the preview display area 307.

Figure 9:
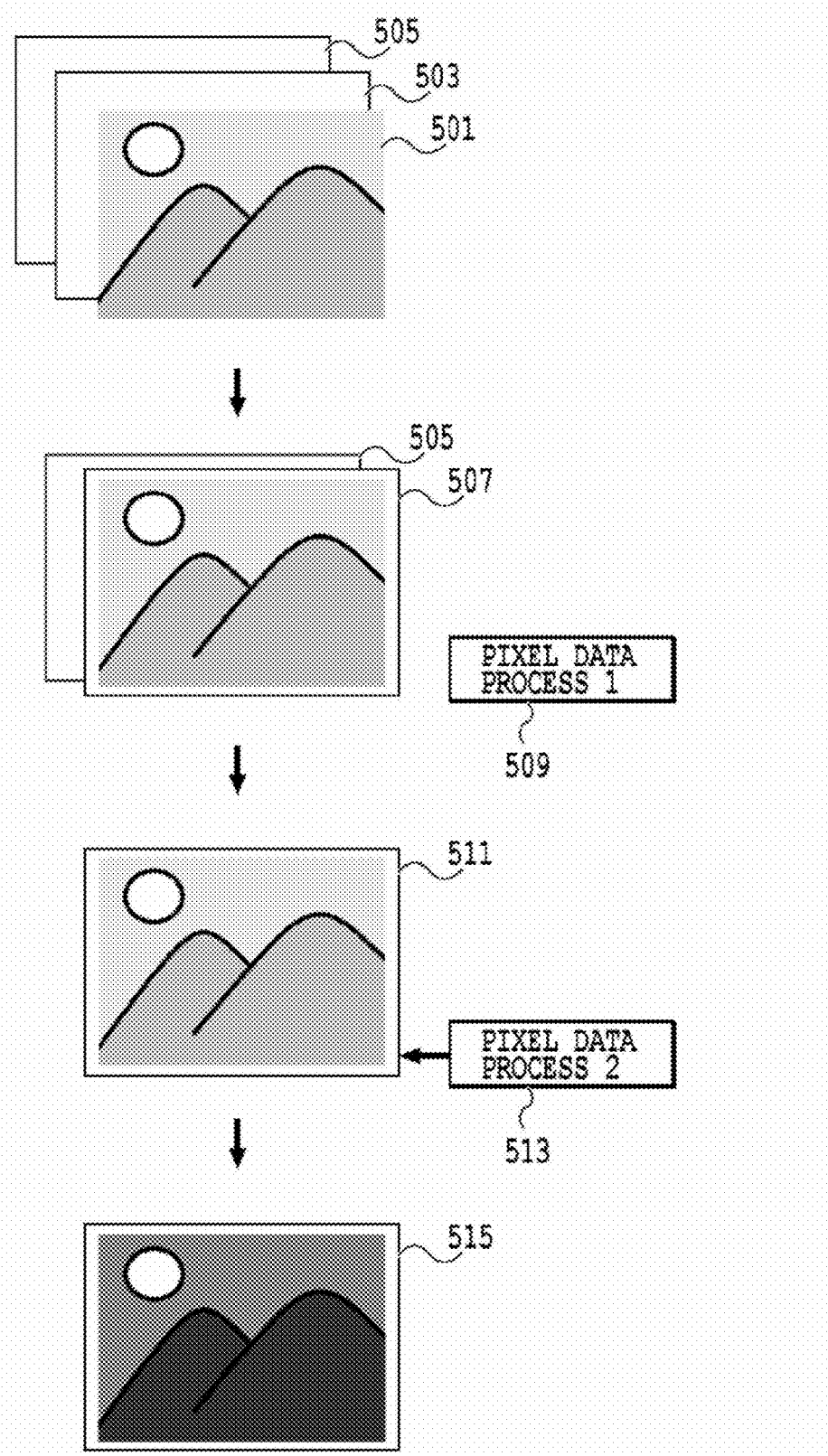
FIG. 9 is a view showing the pixel data process according to the setting item in accordance with the embodiment of the present invention.

FIG. 9 is a view showing processing executed in the case where any of brightness, density and contrast is not changed and tone is changed in the print setting changing area 313. Since setting of brightness, density and contrast is not changed, the preview control module 203 cancels the pixel data process 1 from the base display control 503. Further, since setting of tone is changed, the preview control module 203 assigns the pixel data process 2 to the pixel data process-display control 505.

At display updating, the OS first generates pixel data 507 obtained by overlapping the document display control 501 and the base display control 503. Since assignment of the pixel data process 1 to the base display control 503 is cancelled, the OS superimposes the pixel data 507 as it is and the pixel data process-display control 505 to generate the pixel data 511. Contents of the pixel data 511 are the same as those of the pixel data 507. Since the pixel data process 2 is assigned to the pixel data process-display control, the OS processes the pixel data 511 according to set values of monochrome conversion and tone, generates the pixel data 515, and displays it in the preview display area 307.

In the case where any of brightness, density and contrast is changed and tone is also changed, as shown in FIG. 6, the preview control module assigns the pixel data process 1 and the pixel data process 2 to the corresponding display controls.

Figure 10B:
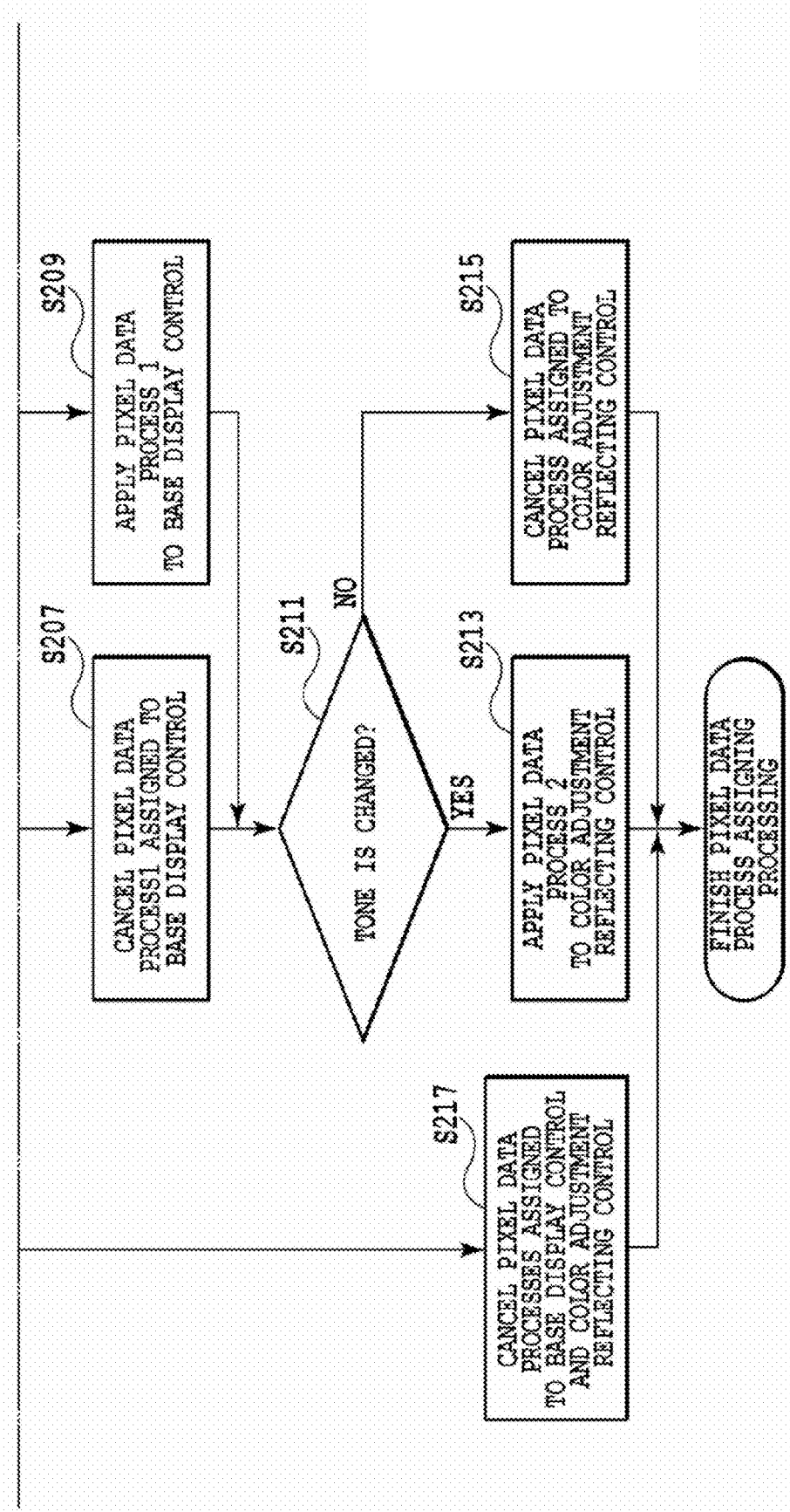

FIGS. 10A and 10B show an example of a flow chart showing processing in which the preview control module 203 changes assignment of the pixel data process according to the setting item. First, in S201, the preview control module 203 determines whether or not monochrome-printing setting is ON, and the procedure proceeds to S203 in the case of ON, and proceeds to S217 in the case of OFF. In S203 to S209, the pixel data process 1 (509) is assigned or cancelled. In S203, the preview control module 203 determines whether or not any of brightness, density and contrast as setting items corresponding to the pixel data process 1 (509) is changed. In the case where even one of the setting items is changed, the procedure proceeds to S209, and in the case where no setting item is changed, the procedure proceeds to S205.

In S205, the preview control module 203 determines whether or not setting of tone is changed, and in the case of YES, the procedure proceeds to S207, and in the case of NO, the procedure proceeds to S209. In S207, since brightness, density and contrast are not changed and tone is changed, the pixel data process 1 (509) needs not to be executed. Accordingly, the preview control module 203 cancels assignment to the base display control 503, and the procedure proceeds to S211. In S209, any of brightness, density and contrast is changed or none of brightness, density, contrast and tone is changed. For this reason, the preview control module 203 assigns the pixel data process 1 (509) to the base display control 503, and the procedure proceeds to S211. The reason why the pixel data process 1 (509) is assigned in the case where no setting is changed is execution of monochrome conversion. However, this can be performed in the pixel data process 2 (513).

In S211 to S215, the pixel data process 2 (513) is assigned or cancelled. In S211, the preview control module 203 determines whether or not setting of tone is changed, and in the case of YES, the procedure proceeds to S213, and in the case of NO, the procedure proceeds to S215. In S213, since tone is changed, the preview control module 203 assigns the pixel data process 2 (513) to the pixel data process-display control 505. In S215, since tone is not changed, the preview control module 203 cancels the pixel data process 2 (513) from the pixel data process-display control 505.

S217 is processing executed in the case where the monochrome-printing setting is OFF. In the present embodiment, the print setting changing area 313 can be set only in the case where the monochrome-printing setting is ON. Thus, in S217, the preview control module 203 cancels the pixel data process assigned to each of the base display control 503 and the pixel data process-display control 505. At display updating, the pixel data processes set in S201 to S217 are executed to convert contents to be displayed in the preview display area 307. With such configuration, the processing time can be decreased without executing the unnecessary pixel data process.

Although the print preview function of the printer driver has been described in the first embodiment, the present embodiment can be applied to general application in which display contents are dynamically converted according to settings, and its scope is not limited to the print preview function of the printer driver. This also applies to the second embodiment.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-149763, filed Jul. 3, 2012, which is hereby incorporated by reference herein in its entirety.

What is claimed is:

1. An information processing method of displaying image data, comprising:
   receiving first and second set values for image processing; and
   assigning a first image processing based on the first set value to a first layer and a second image processing based on the second set value to a second layer,
   wherein a single image to be displayed is generated based on processing results of both the first image processing and the second image processing,
   wherein the first image processing is applied to a first combined data which is generated by combining data of the first layer with data of an upper layer of the first layer, and
   the second image processing is applied to a second combined data which is generated by combining the first combined data to which the first image processing has been applied with data of the second layer which is lower than the first layer, whereby the single image is displayed.

2. The information processing method according to claim 1, wherein the first image processing is performed in advance of the second image processing.

3. The information processing method according to claim 1, wherein
   the data of the upper layer is a document display control,
   the data of the first layer is a base display control, and
   the data of the second layer is a pixel data process-display control.

4. The information processing method according to claim 1, wherein a preview window displays the single image, and
   the first and second set values for the image processing are received in response to instructions which have been input to the preview window.

5. The information processing method according to claim 1, wherein
   a determination is made as to whether color-printing or monochrome-printing has been designated, and
   in a case where the determination is made that the monochrome-printing has been designated, the first image processing is assigned to the first layer and the second image processing is assigned to the second layer.

6. The information processing method according to claim 1, wherein
   the first image processing is a first pixel data process,
   the second image processing is a second pixel data process,
   the first pixel data process is a processing which corresponds to at least one of a monochrome conversion, a changing in brightness, a changing in density, and a changing in contrast, which has been set as the first set value, and
   the second pixel data process is a processing which corresponds to a changing in tone, which has been set as the second set value.

7. An information processing device for displaying image data, comprising:
   a processor; and
   a memory coupled to the processor and storing a program executed by the processor so as to execute:

receiving first and second set values for image processing; and assigning a first image processing based on the first set value to a first layer and a second image processing based on the second set value to a second layer, wherein a single image to be displayed is generated based on processing results of both the first image processing and the second image processing, wherein the first image processing is applied to a first combined data which is generated by combining data of the first layer with data of an upper layer of the first layer, and the second image processing is applied to a second combined data which is generated by combining the first combined data to which the first image processing has been applied with data of the second layer which is lower than the first layer, whereby the single image is displayed.

8. The information processing device according to claim 7, wherein the first image processing is performed in advance of the second image processing.

9. The information processing device according to claim 7, wherein
the data of the upper layer is a document display control,
the data of the first layer is a base display control, and
the data of the second layer is a pixel data process-display control.

10. The information processing device according to claim 7, wherein a preview window displays the single image, and
the first and second set values for the image processing are received in response to instructions which have been input to the preview window.

11. The information processing device according to claim 7, wherein a determination is made as to whether color-printing or monochrome-printing has been designated, and
in a case where the determination is made that the monochrome-printing has been designated, the first image processing is assigned to the first layer and the second image processing is assigned to the second layer.

12. A non-transitory computer readable storage medium storing a program for causing a computer to function for displaying image data, the program comprising:
code for receiving first and second set values for image processing; and
code for assigning a first image processing based on the first set value to a first layer and a second image processing based on the second set value to a second layer,
wherein a single image to be displayed is generated based on processing results of both the first image processing and the second image processing,
wherein the first image processing is applied to a first combined data which is generated by combining data of the first layer with data of an upper layer of the first layer, and
the second image processing is applied to a second combined data which is generated by combining the first combined data to which the first image processing has been applied with data of the second layer which is lower than the first layer, whereby the single image is displayed.

13. The non-transitory computer readable storage medium according to claim 12, wherein the first image processing is performed in advance of the second image processing.

14. The non-transitory computer readable storage medium according to claim 12, wherein
the data of the upper layer is a document display control,
the data of the first layer is a base display control, and
the data of the second layer is a pixel data process-display control.

15. The non-transitory computer readable storage medium according to claim 12, wherein a preview window displays the single image, and
the first and second set values for the image processing are received in response to instructions which have been input to the preview window.

16. The non-transitory computer readable storage medium according to claim 12, wherein
a determination is made as to whether color-printing or monochrome-printing has been designated, and
in a case where the determination is made that the monochrome-printing has been designated, the first image processing is assigned to the first layer and the second image processing is assigned to the second layer.

17. The non-transitory computer readable storage medium according to claim 12, wherein
the first image processing is a first pixel data process,
the second image processing is a second pixel data process,
the first pixel data process is a processing which corresponds to at least one of a monochrome conversion, a changing in brightness, a changing in density, and a changing in contrast, which has been set as the first set value, and
the second pixel data process is a processing which corresponds to a changing in tone, which has been set as the second set value.

* * * * *